(12) United States Patent
DeKimpe et al.

(10) Patent No.: US 6,480,848 B1
(45) Date of Patent: Nov. 12, 2002

(54) EXTENSION OF DATA DEFINITION LANGUAGE (DDL) CAPABILITIES FOR RELATIONAL DATABASES FOR APPLICATIONS ISSUING DML AND DDL STATEMENTS

(75) Inventors: Daniel Martin DeKimpe, La Selva Beach; William Earl Malloy, Santa Clara; Craig Reginald Tomlyn, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/356,059

(22) Filed: Jul. 19, 1999

(51) Int. Cl.[7] .............................................. G06F 17/30
(52) U.S. Cl. ...................... 707/8; 707/1; 707/2; 707/3; 707/7
(58) Field of Search ................................. 707/1–3, 7, 8

(56) References Cited

U.S. PATENT DOCUMENTS

| | | | |
|---|---|---|---|
| 5,551,027 A | 8/1996 | Choy et al. | |
| 5,794,241 A | 8/1998 | Loaiza | |
| 5,819,251 A | * 10/1998 | Kremer et al. | 707/1 |
| 5,905,985 A | 5/1999 | Malloy et al. | |
| 6,115,704 A | * 9/2000 | Olson et al. | 707/3 |

OTHER PUBLICATIONS

*System Supplied Data Integrity;* Software Patent Institute Database of Software Technologies pp.3718–3721 (Dec. 82), IBM TDB1282.0136.

* cited by examiner

Primary Examiner—Hosain T. Alam
Assistant Examiner—Cam-Y Truong

(57) ABSTRACT

A method, apparatus, and article of manufacture for DDL Extension layer that provides extended data definition language (DDL) capabilities for relational databases with multi-connections. A plurality of commands comprising data definition language statements and data modification language statements may be received from an application. Then, separate database connections for processing the data definition language statements and the data modification language statements are generated.

27 Claims, 6 Drawing Sheets

SQL LOG TABLE 400

| COMMAND | ROLLBACK OR COMMIT | ORDER | UNIT OF WORK | APPLICATION IDENTIFIER |
|---|---|---|---|---|
| DROP TABLE A | RB | 1 | 1 | APPLICATION ONE |
| CREATE VIEW X | RB | 2 | 1 | APPLICATION ONE |
| DELETE ENTRY IN SQL VIEW/INDEX TABLE | C | 3 | 1 | APPLICATION ONE |
| DROP VIEW X | RB | 4 | 1 | APPLICATION ONE |
| RENAME (NEWNAMEP TO P) | RB | 5 | 1 | APPLICATION ONE |
| DROP NEWNAMEP | C | 6 | 1 | APPLICATION ONE |

FIG. 4

SQL VIEW/INDEX TABLE 500

| NAME | SQL STATEMENTS | DELETE TAG |
|---|---|---|
| X | CREATE VIEW (COL1, COL2) AS ... | 3 |
|  | ... |  |

EXTENSION OF DATA DEFINITION LANGUAGE (DDL) CAPABILITIES FOR RELATIONAL DATABASES FOR APPLICATIONS ISSUING DML AND DDL STATEMENTS

CROSS-REFERENCE TO RELATED APPLICATIONS

This application is related to the following co-pending and commonly-assigned patent applications:

Application Ser. No. 09/356,471, entitled "EXTENSION OF DATA DEFINITION LANGUAGE (DDL) CAPABILITIES FOR RELATIONAL a DATABASES WITH LOGGING," filed on Jul. 19, 1999, by Daniel M. DeKimpe et al., application pending; and Application Ser. No. 09/356,644, entitled "EXTENSION OF DATA DEFINITION LANGUAGE (DDL) CAPABILITIES FOR RELATIONAL DATABASES WITH MULTIPLE UNITS OF WORK," filed on Jul. 19, 1999, by Daniel M. DeKimpe et al., application pending;

each of which is incorporated by reference herein.

BACKGROUND OF THE INVENTION

1. Field of the Invention

This invention relates in general to database management systems performed by computers, and in particular, to the extension of data definition language (DDL) capabilities for relational databases.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data. The definitions for SQL provide that a RDBMS should respond to a particular query with a particular set of data given a specified database content, but the method that the RDBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of performing the query.

Applications (i.e., application programs) communicate with relational databases using the Structured Query Language (SQL). SQL statements are issued to the RDBMS, which executes the SQL statements to access a relational database. The SQL statements received from an application are executed within a "unit of work", which is a collection of related SQL statements. Once the SQL statements are executed, they are either "committed" (i.e., the changes made by the executed SQL statements is made permanent in the relational database) or they are "rolled back" (i.e., the changes made by the executed SQL statements are removed, returning the relational database to the state it was in prior to execution of these statements).

The SQL statements that involve modifying data (e.g., inserting, updating or deleting rows) are called Data Modification Language (DML) statements. The SQL statements that involve defining database elements (e.g., defining data tables, views, or indexes) are called Data Definition Language (DDL) statements. Not all relational databases support DDL statements in the same way.

In particular, DB2 for the Workstation (i.e., NT, AIX, etc.), from International Business machines, Corporation, supports the capability of rolling back DDL statements that have been executed within a unit of work. On the other hand, a relational database from Oracle supports "automatic commit" for DDL statements. That is, the Oracle relational database automatically commits changes for a DDL statement as that DDL statement is executed. Once these changes are committed, the Oracle relational database does not support rolling back the DDL statement changes. This means that a series of DDL statements cannot be rolled back if an error occurs somewhere along the thread of execution.

Also, DB2 for the workstation supports the capability of creating a view or index with a name, dropping that view or index, and then creating another view or index with that name, within the same unit of work. Because DB2 for the workstation has the capability of rolling back statements for a unit of work, an application has rollback capability when reusing view or index names. However, DB2 for the 390, from International Business Machines, Corporation, requires an application to perform a commit prior to reusing a name for a view or index. Since rollback is not available after changes have been committed, an application calling DB2 on the 390 does not have the capability of rolling back changes for a unit of work, if that unit of work has dropped and recreated an index or view with the same name.

Both of these problems mean that any application which issues DDL statements and which wants the ability to roll back the DDL statements, would need to be written differently to support these three relational database systems (i.e., platforms): DB2 for the Workstation, DB2 for 390, and Oracle. Therefore, there is a need in the art for extension of data definition language (DDL) capabilities for relational databases to support different relational database systems.

SUMMARY OF THE INVENTION

To overcome the limitations in the prior art described above, and to overcome other limitations that will become apparent upon reading and understanding the present specification, the present invention discloses a method, apparatus, and article of manufacture for a DDL Extension layer that provides extended data definition language (DDL) capabilities for relational databases.

According to an embodiment of the invention, a command is executed in a computer to perform a database operation on a relational database stored on a data store connected to the computer. A plurality of commands comprising data definition language statements and data modification language statements may be received from an application. Then, separate database connections for processing the data definition language statements and the data modification language statements are generated.

BRIEF DESCRIPTION OF THE DRAWINGS

Referring now to the drawings in which like reference numbers represent corresponding parts throughout:

FIG. 4 is a chart of a SQL Log Table maintained by a DDL extension layer;

FIG. 5 is a chart illustrating an SQL View/Index Table maintained by a DDL extension layer.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

HARDWARE ENVIRONMENT

Figure 1:
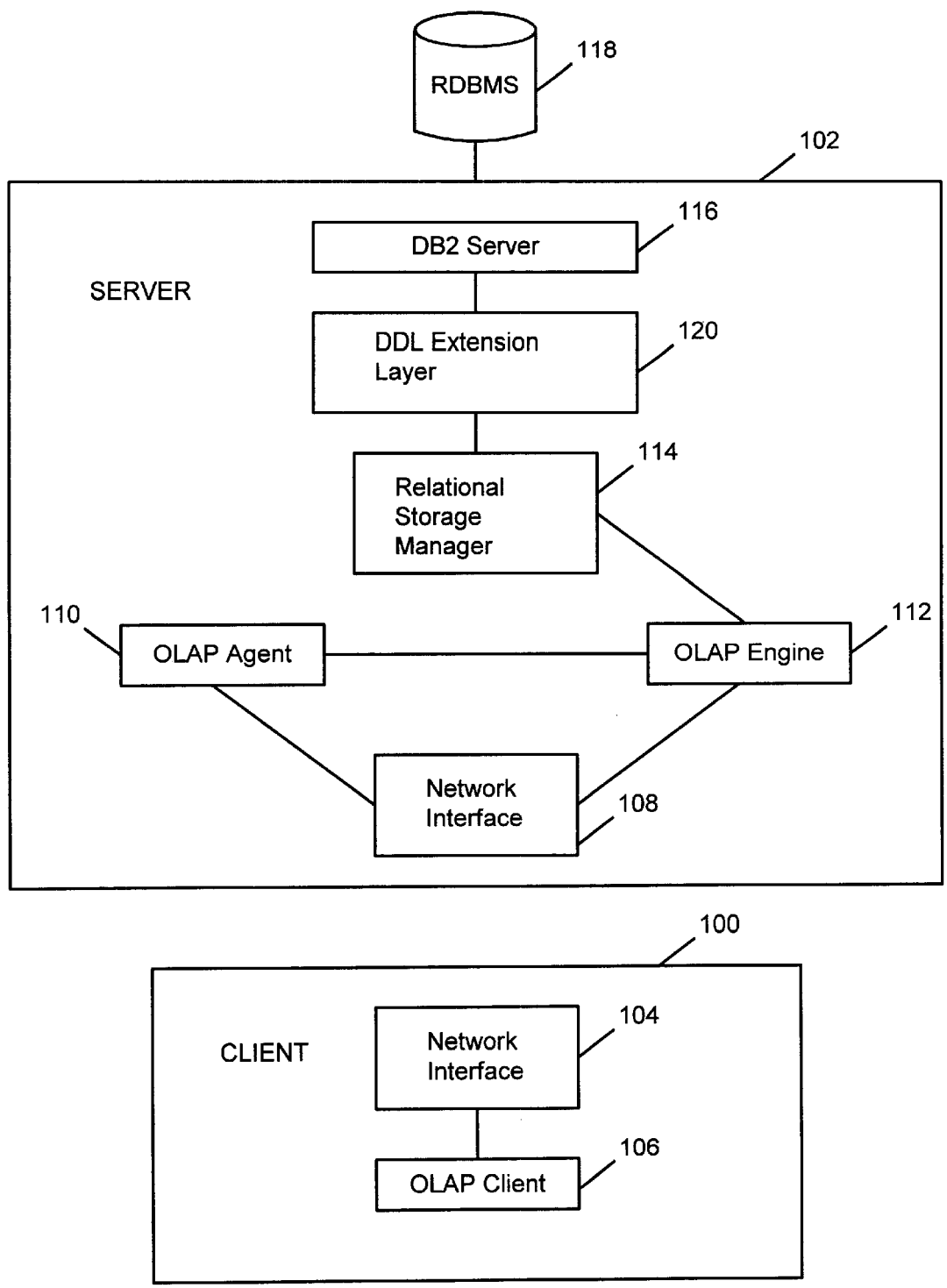
FIG. 1 is a hardware environment used to implement a preferred embodiment of the invention.

FIG. 1 is a block diagram illustrating a hardware environment used to implement the preferred embodiment of the present invention. In the hardware environment, a client/server architecture is illustrated comprising an OLAP client computer 100 coupled to an OLAP server computer 102. An OLAP system that is designed for a wide-range of multidimensional reporting and analysis applications. The OLAP system is based both on Arbor Software's Essbase OLAP software and IBM's DB2 RDBMS software. The embodiment of the present invention utilizes a number of components from Arbor Software's Essbase OLAP system, including components that provide data access, navigation, application design and management and data calculation. However, the embodiment of the present invention comprises new elements that perform database operations, such as storing and retrieving data, for the OLAP system in a relational database. The embodiment of the present invention replaces the integrated multi-dimensional data storage manager of Arbor Software's Essbase OLAP software with a relational storage manager based on IBM's DB2 RDBMS software. The relational storage manager enables the OLAP system to store data directly into a relational database.

In the hardware environment, the OLAP client 100 and OLAP server 102 may each include, inter alia, a processor, memory, keyboard, or display, and may be connected locally or remotely to fixed and/or removable data storage devices and/or data communications devices. Each of the computers 100 and 102 also could be connected to other computer systems via the data communications devices. Those skilled in the art will recognize that any combination of the above components, or any number of different components, peripherals, and other devices, may be used with the computers 100 and 102. Those skilled in the art will also recognize that the present invention may be implemented on a single computer, rather than multiple computers networked together.

The present invention is typically implemented using one or more computer programs, each of which executes under the control of an operating system, such as OS/2, Windows, DOS, AMX, UbUX, MVS, etc., and causes the computers 100 and 102 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the computers 100 and 102, cause the computers 100 and 102 to perform the steps necessary to implement and/or use the present invention. Under control of the operating system, the computer programs may be loaded from the memory, data storage devices, and/or data communications devices into the memories of the computers 100 and 102 for use during actual operations. Those skilled in the art will recognize many modifications may be made to this configuration without departing from the scope of the present invention.

In the example illustrated in FIG. 1, the present invention includes a network interface program 104 and an OLAP client program 106 executed by the OLAP client 100; and, a network interface program 108, an OLAP agent program 110, an OLAP engine program 112, a relational storage manager (RSM) program 114, a DDL Extension Layer 120, and a DB2 server program 116 executed by the OLAP server 102. The DB2 server program 116, in turn, performs various database operations, including search and retrieval operations, termed queries, insert operations, update operations, and delete operations, against one or more RDBMSs (i.e., relational databases) 118 stored on a remote or local data storage device. The DDL Extension Layer 120 extends data definition language (DDL) capabilities for relational databases.

The present invention utilizes a number of components from Arbor Software's Essbase OLAP system, including the network interface 104, OLAP client 106, network interface 108, OLAP agent 110, and OLAP engine 112. These components provide data access, navigation, application design and management and data calculation. However, the relational storage manager 114 and DB2 server 116 comprise new elements that access (e.g., store and retrieve) data for the OLAP system in a relational database.

Although the present specification describes the use of IBM's DB2 RDBMS software, those skilled in the art will recognize that the present invention can use DB2, Oracle, Informix, Sybase, or other RDBMS software, and can run on computers using IBM OS/2, Microsoft Windows NT, IBM-AIX, Hewlett-Packard HP-UX, Sun Solaris, and other operating systems.

Additionally, in an alternative embodiment, the technique of the present invention may be part of the RDBMS.

Those skilled in the art will recognize that the hardware environment illustrated in FIG. 1 is not intended to limit the present invention. Indeed, those skilled in the art will recognize that other alternative hardware environments may be used without departing from the scope of the present invention. For example, the techniques of the present invention may be implemented in systems other than the OLAP system discussed above. Also, the techniques of the present invention may be implemented without the OLAP components discussed above.

Extension of Data Definition Language (DDL) Capabilities for Relational Databases For Applications Issuing DDL Statements An embodiment of the invention provides aDDL extension layer that solves the problems encountered by an application when working on different relational database systems (e.g., DB2 for the workstation, DB2 for 390, and Oracle). The DDL extension layer uses logging to enable applications to avoid the problems associated with the techniques different relational database systems use for performing commits and rollbacks. Additionally, the DDL extension layer uses a common code base for an application for different relational database systems, which provides the advantage of simplifying design, coding and testing, as well as reducing maintenance effort on the code.

Figure 2:
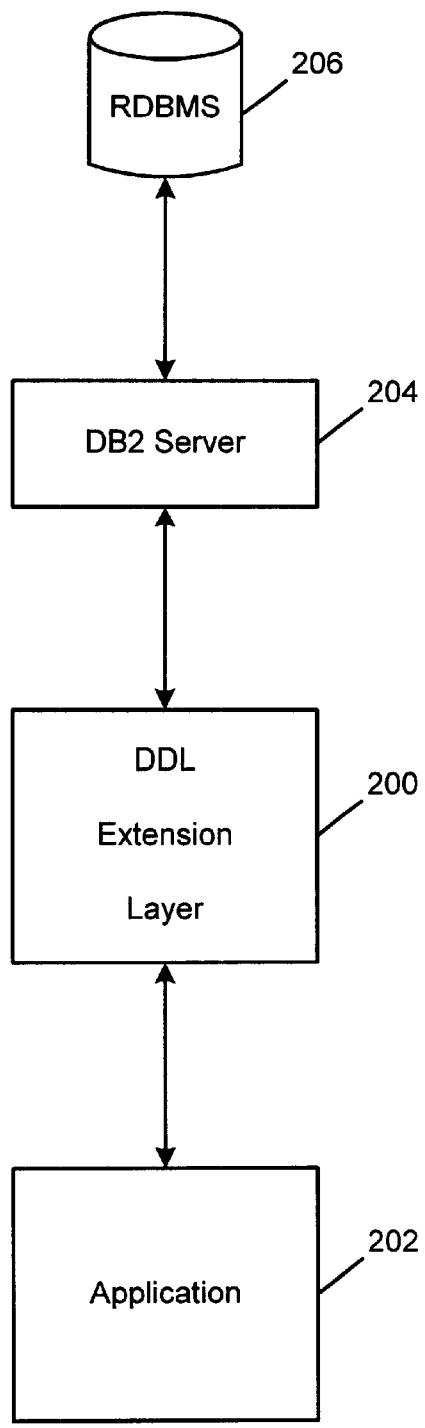
FIG. 2 is a block diagram illustrating the use of a DDL extension layer.

FIG. 2 is a block diagram illustrating the use of a DDL extension layer. The DDL extension layer 200 is provided between the application 202 and the DB2 server 204. In one embodiment, the application 202 may be the relational storage manager 114. The DB2 server accesses the relational database 206. The DDL extension layer 200 enables the application 202 to perform rollback for DDL statements, without relying on the relational database 206 to perform rollback. Thus, regardless of the relational database 206 used, via the DDL extension layer 200, rollback is available.

In particular, the DDL extension layer 200 provides a rollback feature for DDL statements within the application by creating a log table in the relational database to store statements that may need to be rolled back by the application. When the application calling the relational database needs to execute a DDL statement (e.g., CREATE VIEW), the DDL extension layer 200 commits that statements changes and inserts a row into the log table with commands (e.g., text representing SQL statements or "compensating operations") representing an action to be performed for a rollback or a commit. For example, a compensating operation for a CREATE VIEW statement is a DROP VIEW statement (which is the reverse of CREATE VIEW), and this would be entered into the log as a compensating operation. Then, the DDL extension layer 200 executes the original SQL. This small unit of work (i.e., the DDL statement plus the insertion of the compensating operation into the log table) is then committed. If the rest of the work the application performs is successful, the DDL extension layer 200 removes the logged rows inserted for rollback and processes the logged rows for commit. However, if an error occurs which requires the executed DDL statements to be rolled back, the DDL extension layer 200 uses the log table to perform rollback by processing the logged rows for rollback and removes the logged rows for commit.

In particular, the DDL extension layer 200 selects the appropriate row or rows, reads the selected row or rows from the log table, and executes the read commands (i.e., executes the SQL statements represented by the commands). In the example above, a DROP VIEW command string is read from the log table and executed. Thus, the view which had been previously created and committed would be dropped (i.e., deleted), and the relational database would be back to its original state. After each selected row from the log table has been read and executed, that row is deleted from the log table.

This use of the log table by the DDL extension layer 200 allows the application code to have the capability of executing and then committing, or rolling back, a series of DDL statements, even though each individual DDL statement is really being committed in the relational database as it is executed. With the DDL extension layer 200, the "automatic commit" feature of Oracle's relational database is not a problem because each DDL statement is committed anyway, while still enabling rollback by the application. Also, if, with DB2 on the 390, a view or index needs to be dropped, the DROP VIEW or DROP INDEX statement is actually being committed as it is executed. Then, a subsequent CREATE VIEW or CREATE INDEX can use the same name as the dropped VIEW or INDEX, and the application can still have the capability of rolling back both DDL statements.

Figure 3:
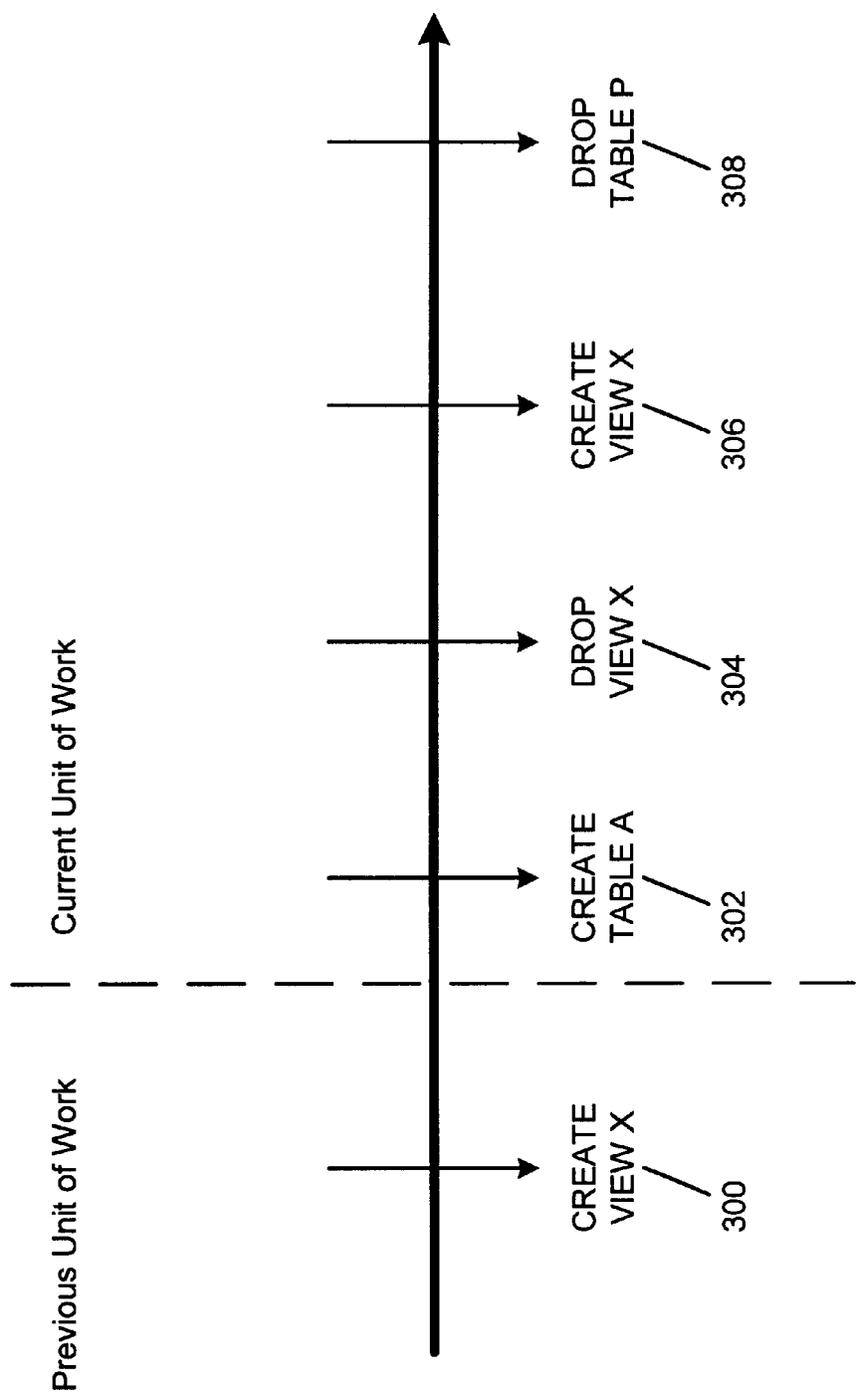
FIG. 3 is a chart of a series of DDL statements that are executed.

FIGS. 3 and 4 will be used to provide additional details of the DDL extension layer 200. FIG. 3 is a chart 300 of a series of DDL statements that are executed, and these DDL statements will be used as examples in the following discussion. FIG. 4 is a chart of a SQL Log Table 400 maintained by the DDL extension layer 200. The SQL Log is a table with four columns (i.e., Command, Rollback or Commit, Order, Unit of Work, and Application Identifier), and each of the columns of the SQL Log Table 400 will be discussed below.

Initially, in the example of FIG. 3, a horizontal arrow representing a timeline is shown with a dashed vertical line separating a previous unit of work from a current unit of work. In the previous unit of work, a CREATE VIEW X statement 300 was executed. After the previous unit of work was completed, the DDL extension layer 200 processed the compensating entries in the SQL Log Table 400 for that unit of work. In the current unit of work, a CREATE TABLE A statement 302 is executed. Therefore, the DDL extension layer 200 enters a row 402 in the SQL Log Table 400. The command for row 402 is DROP TABLE A, which performs the reverse action of CREATE TABLE A.

The next statement executed is DROP VIEW X 304, and the DDL extension layer 200 enters a row 406 into the SQL Log Table 400 with a CREATE VIEW X command. The reverse action of a DROP VIEW or DROP INDEX statement is a CREATE VIEW or CREATE IDEX statement, respectively. Both CREATE statements need to specify the definition of the entity (i.e., view or index). For example, a CREATE statement needs to indicate the columns to be used for the VIEW or INDEX. This definition cannot be queried directly from the view or index at the time when the view or index is being dropped. One solution could be to query the definition from system tables stored in the relational database. However, the application may not have the authority to query system tables (i.e., in some cases, only a system administrator may be given access to these tables), and so the application may not be able to obtain the definitions for the CREATE VIEW or INDEX using system tables.

Thus, the DDL extension layer 200 creates a second table, which is called the SQL View/Index Table, for storing the definitions of CREATE VIEW or INDEX statements. Because some entities are created in a previous unit of work (e.g., a VIEW was created with CREATE VIEW statement 300 in a previous unit of work), and because the compensating operations for that unit of work are processed and removed from the SQL Log Table 400 after the unit of work is complete, it is especially useful to store the commands for creating that entity in a table separate from the SQL Log Table 400. FIG. 5 is a chart illustrating an SQL View/Index Table. When a view or index is created (e.g., the CREATE VIEW X statement 300), the DDL extension layer 200 inserts a row into the SQL View/Index Table 500 that contains the name of the view or index, along with the CREATE statement string. Note that at the time of creating an entity, the delete tag is not set; instead, at the time of deleting an entity, the delete tag is set.

At the point when a view or index is dropped (e.g., the DROP VIEW X statement 304), the DDL extension layer 200 obtains the reverse SQL statement (e.g., the CREATE VIEW X statement) from the SQL View/Index Table 500 and inserts the statement into the SQL Log Table 400 in preparation for rolling back the DROP VIEW X statement The row in the SQL View/Index Table 500 corresponding to VIEW X is updated with a delete tag. The delete tag identifies the row in the SQL Log Table 400 with which it is associated, and, in particular, the delete tag references the order number from the ORDER column in the SQL Log Table 400. In addition, when a view or index is dropped, the DDL extension layer 200 adds a row 408 to the SQL Log Table 400 with a command to delete the corresponding entity's entry in the SQL View/Index Table 500. The row is tagged as a commit row. Therefore, if the drop of the view or index is committed, the row corresponding to the entity will be removed from the SQL View/Index Table 500.

In particular, each row of the SQL Log Table 400 has an entry for a ROLLBACK OR COMMIT column. The entry indicates whether the operation is to be performed on a commit or a rollback operation. For example, if the SQL statements in a fact tables execute successfully, the application will want to commit the changes. Therefore, the DDL extension layer 200 performs the commit operations, such as deleting entries from the SQL View/Index Table 500. Then, the DDL extension layer 200 deletes entries for the commit and rollback operations from the SQL Log Table 400. If, on the other hand, the SQL statements in a fact tables did not execute successfully, the application will want to rollback the changes. In this case, the DDL extension layer 200 performs the rollback entries. Then, the DDL extension layer 200 deletes the commit and rollback entries from the SQL Log Table 400.

Continuing with the example in FIG. 3, a CREATE VIEW X statement 306 is executed. Because each statement is committed as it is executed, and because rollback is still available, regardless of the relational database system being accessed, the view name "X" can be reused. The DDL extension layer 200 adds a row 410 to the SQL Log Table 400 to drop the view in case of a rollback.

Then, a DROP TABLE P statement 308 is executed. The reverse of a DROP TABLE statement, for a table which contains data, is a CREATE TABLE statement followed by, potentially, millions of INSERT statements. It would be impracticable to store this many rows in the SQL Log Table 400. Therefore, when a DROP TABLE statement is executed, the DDL extension layer 200 renames the table to be dropped (e.g., TABLE P) to some temporary name (i.e., RENAME <original table name>TO <new table name>), rather than dropping the table immediately.

In case of rollback, the DDL extension layer 200 will need to reverse the RENAME command, and so the DDL extension layer 200 adds a row with a compensating entry to the SQL Log Table 400 with another RENAME command (i.e., RENAME <new tablename>TO <original table name>). Therefore, the DDL extension layer 200 adds a row 412 (e.g., RENAME NEWNAME P TO P) to the SQL Log Table 400. This row 412 also contains a flag which tags it as a rollback row.

In the case of a commit, rather than renaming the newly named table back to its original name, the DDL extension layer 200 drops the newly named table. Therefore, the DDL extension layer 200 adds a row 414 (e.g., DROP NEWNAMEP) to the SQL Log Table 400. This row 414 contains a flag which tags it as a commit row. Both the RENAME and DROP statements are added to the SQL Log Table 400 before the initial RENAME command is executed.

In summary, if, at some point, the application wants to rollback the executed DDL it can execute the rollback row which will rename the temporary table back to its original name. If the application wants to commit the DDL statements the commit row is executed and the temporary table is dropped. This renaming technique is used for tables, but not for views or indexes. This is due to the fact that views or indexes cannot be renamed like tables.

When an application decides to roll back or commit a set of DDL interactions, the application uses the DDL extension layer 200 to SELECT corresponding rows from the SQL Log Table 400 and executes the stored SQL. Typically, relational databases do not guarantee the order of the rows returned by a SELECT. This absence of order may be a problem if one DDL interaction is dependent upon another (e.g., if a view is dropped and then a new view is created with the same name, then, clearly, the drop must happen before the create.) The DDL extension layer 200 avoids this problem by using an order column in the SQL Log Table 400. Therefore, each row added to the SQL Log Table 400 is given a unique order number. Order numbers are incremented for each row added to the SQL Log Table 400. When the application decides to commit or roll back a set of DDL interactions, the application uses the DDL extension layer to SELECT the appropriate rows using an ORDER BY clause based on the column containing the order number. When SELECTing rows for a roll back, the rows are ORDERed in descending order, so that the logged rollback SQL statements are executed in reverse order. When SELECTing rows for a commit, the rows are ORDERed in ascending order, so that the logged commit SQL statements are executed in the order logged. This ordering avoids any problems with inter-dependencies between the logged SQL.

The DDL extension layer 200 also uses the SQL Log Table 400 in cases in which the relational database crashes or is powered off as a series of DDL statements are being executed. When the relational database crashes or powers off, the relational database is left in an invalid by state, because the set of SQL statements should be rolled back. Therefore, when the first connection is made to the relational database, the application uses the DDL extension layer 200 to query the SQL Log Table 400 to determine whether the SQL Log Table 400 contains any entries. If the SQL Log Table 400 contains entries, the application recognizes that these entries must have been left over from a previous failure, and the application uses the DDL execution layer 200 to execute them before proceeding.

Extension of Data Definition Language (DDL) Capabilities for Relational Databases For Applications Issuing Multiple Units of Work An embodiment of the present invention provides a DDL extension layer 200 that is used by multiple units of work (i.e., applications). Each unit of work uses a separate connection to the relational database. A connection is a relational database concept that enables a unit of work to submnit a request (i.e., query) to the relational database. Each connection has a "handle", which is a unique identifier that identifies that connection. The DDL extension layer 200 tracks the connection used by each unit of work to associate log entries with that unit of work.

Multiple units of work, each executing a set of SQL statements, can run in parallel against a relational database. Each unit of work could be issuing DDL statements. Therefore, the SQL Log Table 400 is populated with rows corresponding to more than one unit of work. When one of the units of work is committed or rolled back, an application will not be able to detect which rows in the SQL Log Table 400 belong to it, and which belong to other units of work. Therefore, the DDL extension layer 200 includes a column in the SQL Log Table 400 for identifying the UNIT OF WORK with which a row is associated. The identifier for the UNIT OF WORK is the handle for the connection that the unit of work is using. When the unit of work is committed or rolled back, the application can use the DDL extension layer 200 to select just those rows from the SQL Log Table 400 that contain the appropriate unit of work identifier and only execute the statements from those selected rows.

Extension of Data Definition Language (DDL) Capabilities for Relational Databases for Applications issuing DML and DDL Statements An embodiment of the present invention provides a DDL extension layer 200 that uses of separate connections to issue DML and DDL statements. In particular, some applications intersperse DML statements with DDL statements. In the preferred embodiment of the invention, a commit is performed after each DDL statement is issued by an application. Therefore, any DML statements issued before a DDL statement would also be committed along with the DDL statement, if the DML and DDL statements were issued on the same connection. However, DML statements are typically too numerous and varied to be sensibly logged at the application level in the SQL Log Table 400, although they are still logged by the RDBMS. Therefore, the application uses the DDL extension layer 200 to generate two connections to the relational database. One connection is used to issue DML statements, and other connection is used to issue the DDL statements, plus the associated logging activity with the SQL Log Table 400.

In effect, for commits and rollbacks, the DDL extension layer 200 uses the relational database's built-in roll back and commit functions to handle rollback and commit of the DML statements and uses the SQL Log Table 400 to handle commit and rollback of the DDL statements. In particular, if the application wants to commit a set of interactions, the DDL extension layer 200 first uses the DML connection to commit the DML statements for a unit of work in the relational database. Then, the DDL extension layer 200 commits activities with the SQL Log Table 400 using the DDL connection. Likewise, if the application wants to rollback interactions, the DDL extension layer 200 rolls back the DML changes using the DML connection and rolls back operations specified in the SQL Log Table 400 using the DDL connection.

Figure 6:
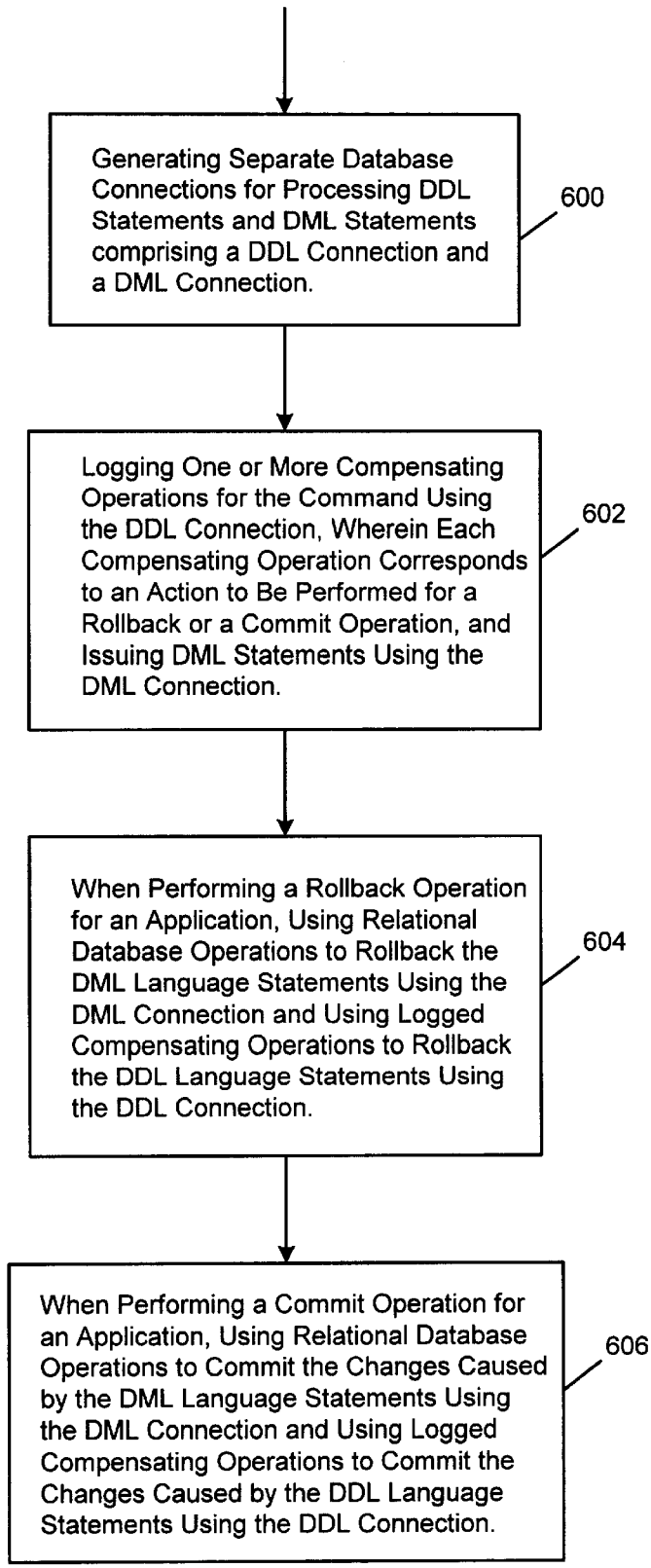
FIG. 6 is a flow diagram illustrating steps performed by a DDL extension layer when an application issues DML and DDL statements.

FIG. 6 is a flow diagram illustrating the steps performed by a DDL extension layer 200 when an application issues DML and DDL statements. In block 600, the DDL extension layer 200 generates separate database connections for processing DDL statements and DML statements. In block 602, the DDL extension layer 200 logs one or more compensating operations for the command using the DDL connection, wherein each compensating operation corresponds to an action to be performed for a rollback or a commit operation, and issues DML statements using the DML connection. In block 604, when performing a rollback operation, the DDL extension layer 200 uses relational database operations to rollback the DML language statements using the DML connection and uses logged compensating operations to rollback DDL language statements using the DDL connection. In block 606, when performing a commit operation, the DDL extension layer 200 uses relational database operations to commit the changes caused by the DML language statements using the DML connection and uses logged compensating operations to commit the changes caused by the DDL language statements using the DDL connection.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a command in a computer to perform a database operation on a relational database stored on a data store connected to the computer, the method comprising the steps of:

receiving a plurality of commands comprising data definition language statements and data modification language statements from an application;

generating separate database connections for processing the data definition language statements and the data modification language statements;

logging one or more compensating operations for each data definition language statement, wherein each compensating operation corresponds to an action to be performed for a rollback or a commit operation; and when performing a rollback operation for one of the applications, using the logged compensating operations to rollback the data definition language statements in the relational database.

2. The method of claim 1, further comprising the steps of:

when performing a commit operation for one of the applications, using relational database operations to commit changes made by the data modification language statements; and using the logged compensating operations to process the data definition language statements.

3. An apparatus for executing a command in a computer, comprising:

a computer having a data store coupled thereto, wherein the data store stores a relational database;

one or more computer programs, performed by the computer, for receiving a plurality of commands comprising data definition language statements and data modification language statements from an application and generating separate database connections for processing the data definition language statements and the data modification language statements;

means for logging one or more compensating operations for each data definition language statement, wherein each compensating operation corresponds to an action to be performed for a rollback or a commit operation; and when performing a rollback operation for one of the applications, means for using the logged compensating operations to rollback the data definition language statements in the relational database.

4. The apparatus of claim 3, further comprising:

when performing a commit operation for one of the applications,
   means for using relational database operations to commit changes made by the data modification language statements; and
   means for using the logged compensating operations to process the data definition language statements.

5. An article of manufacture comprising a program storage medium readable by a computer and embodying one or more instructions executable by the computer to perform method steps for executing a command to perform a database operation on a relational database stored on a data store connected to the computer, the method comprising the steps of:

receiving a plurality of commands comprising data definition language statements and data modification language statements from an application;

generating separate database connections for processing the data definition language statements and the data modification language statements;

logging one or more compensating operations for each data definition language statement, wherein each compensating operation corresponds to an action to be performed for a rollback or a commit operation; and when performing a rollback operation for one of the applications, using the logged compensating operations to rollback the data definition language statements in the relational database.

6. The article of manufacture of claim 5, further comprising the steps of:

when performing a commit operation for one of the applications,
   using relational database operations to commit changes made by the data modification language statements; and
   using the logged compensating operations to process the data definition language statements.

7. A method of executing a command in a computer to perform a database operation on a relational database stored on a data store connected to the computer, the method comprising the steps of:

receiving a plurality of commands comprising data definition language statements and data modification language statements from an application;

generating separate database connections for processing the data definition language statements and the data modification language statements;

logging one or more compensating operations for each data definition language statement, wherein each compensating operation corresponds to an action to be performed for a rollback or a commit operation; and when performing a rollback operation for one of the applications,
   using relational database operations to rollback the data modification language statements; and
   using the logged compensating operations to rollback the data definition language statements.

8. An apparatus for executing a command in a computer, comprising:

a computer having a data store coupled thereto, wherein the data store stores a relational database;

one or more computer programs, performed by the computer, for receiving a plurality of commands comprising data definition language statements and data modification language statements from an application and generating separate database connections for processing the data definition language statements and the data modification language statements;

means for logging one or more compensating operations for each data definition language statement, wherein each compensating operation corresponds to an action to be performed for a rollback or a commit operation; and when performing a rollback operation for one of the applications,
   means for using relational database operations to rollback the data modification language statements; and
   means for using the logged compensating operations to rollback the data definition language statements.

9. An article of manufacture comprising a program storage medium readable by a computer and embodying one or more instructions executable by the computer to perform method steps for executing a command to perform a database operation on a relational database stored on a data store connected to the computer, the method comprising the steps of:

receiving a plurality of commands comprising data definition language statements and data modification language statements from an application;

generating separate database connections for processing the data definition language statements and the data modification language statements;

logging one or more compensating operations for each data definition language statement, wherein each compensating operation corresponds to an action to be performed for a rollback or a commit operation; and when performing a rollback operation for one of the applications,
   using relational database operations to rollback the data modification language statements; and
   using the logged compensating operations to rollback the data definition language statements.

10. The method of claim 1, wherein the step of using the logged compensating operations to rollback the data definition language statements includes using logged compensating operations to rollback data definition language statements which are committed in the relational database.

11. The apparatus of claim 3, wherein the means for using the logged compensating operations to rollback the data definition language statements includes means for using logged compensating operations to rollback data definition language statements which are committed in the relational database.

12. The article of manufacture of claim 5, wherein the step of using the logged compensating operations to rollback the data definition language statements includes using logged compensating operations to rollback data definition language statements which are committed in the relational database.

13. A method of executing a command in a computer to perform a database operation on a relational database stored on a data store connected with the computer, the method comprising:

receiving a plurality of commands from an application directed to the relational database, the plurality of commands including data definition language statements and data modification language statements;

logging one or more compensating operations for each data definition language statement, wherein each compensating operation corresponds to an action to be performed for a rollback or a commit operation; and, using the logged compensating operations to rollback the data definition lanugage statements.

14. The method according to claim 13, further comprising:

when performing a rollback operation for said application, using relational database operations to rollback the data modification language statements.

15. The method according to claim 13, further comprising:

generating separate database connections to said relational database for processing the data definition language statements and the data modification language statements.

16. The method according to claim 13, further comprising logging one or more compensating operations for each data definition language statement, wherein each compensating operation corresponds to an action to be performed for a rollback or a commit operation.

17. The method according to claim 16, further comprising:

using relational database operations to commit changes made by the data modification language statements;

using the logged compensating operations to process the data definition language statements.

18. An apparatus for executing a command in a computer, comprising:

a computer having a data store coupled thereto, wherein the data store stores a relational database; and, one or more computer programs, performed by the computer, for receiving a plurality of commands from an application directed to the relational database, the plurality of commands including data definition language statements and data modification language statements, logging one or more compensating operations for each data definition language statement, wherein each compensating operation corresponds to an action to be performed for a rollback or a commit operation, and using the logged compensating operations to rollback the data definition language statements.

19. The apparatus according to claim 18, further comprising:

when performing a rollback operation for said application, using relational database operations to rollback the data modification language statements.

20. The method according to claim 18, further comprising:

generating separate database connections to said relational database for processing the data definition language statements and the data modification lanugage statements.

21. The method according to claim 13, further comprising logging one or more compensating operations for each data definition language statement, wherein each compensating operation corresponds to an action to be performed for a rollback or a commit operation.

22. The method according to claim 21, further comprising:

using relational database operations to commit changes made by the data modification language statements; and, using the logged compensating operations to process the data definition language statements.

23. An article of manufacture comprising a program storage medium readable by a computer and embodying one or more instructions executable by the computer to perform method steps for executing a command to perform a database operation on a relational database stored on a data store connected with the computer, the method comprising the steps of:

receiving a plurality of commands from an application directed to the regulational database, the plurality of commands including data definition language statements and data modification language statements; logging one or more compensating operations for each data definition language statement, wherein each compensating operation corresponds to an action to be performed for a rollback or a commit operation; and, using the logged compensating operations to rollback the data definition language statements.

24. The article of manufacture according to claim 23, further comprising:

when performing a rollback operation for said application, using relational database operations to rollback the data modification language statements.

25. The method according to claim 23, further comprising:

generating separate database connections to said relational database for processing the data definition language statements and the data modification language statements.

26. The method according to claim 23, further comprising logging one or more compensating operations for each data definition language statement, wherein each compensating operation corresponds to an action to be performed for a rollback or a commit operation.

27. The method according to claim 26, further comprising:

using relational database operations to commit changes made by the data modification language statements; and, using the logged compensating operations to process the data definition language statements.

* * * * *